Figure 1:
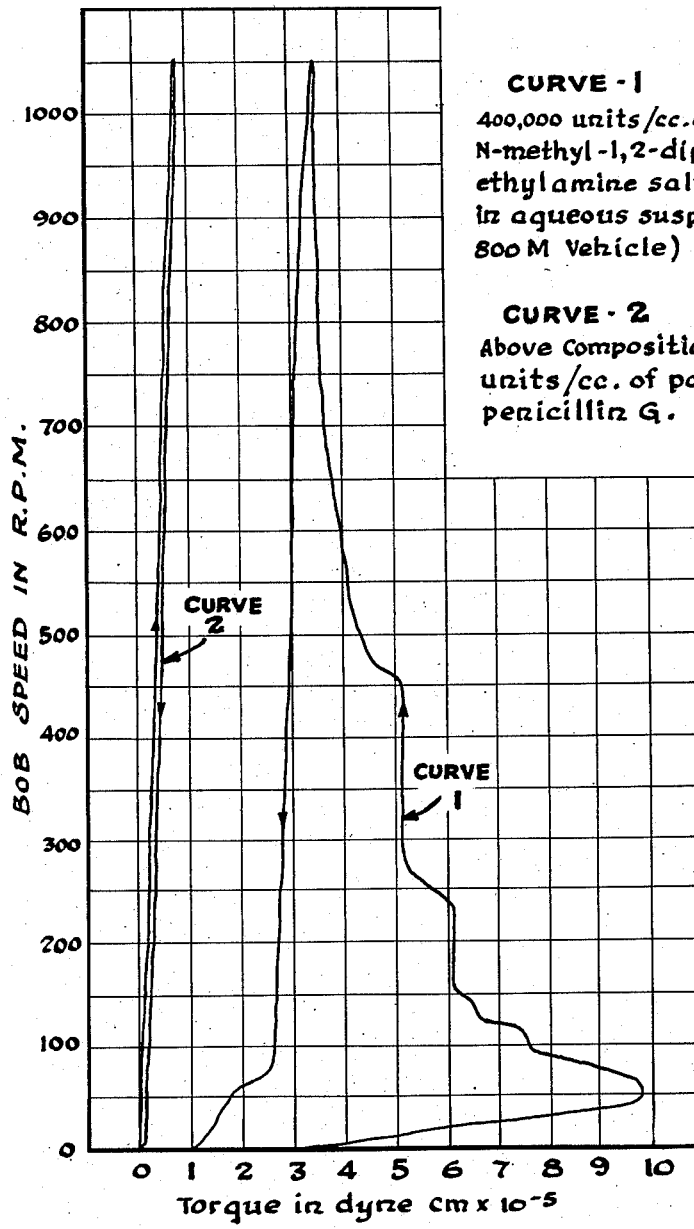

United States Patent Office 2,809,915
Patented Oct. 15, 1957

2,809,915

PARENTERAL COMPOSITION OF WATER SOLUBLE PENICILLIN SALT AND PENICILLIN SALT OF N - METHYL - (2 - HYDROXY-1,2-DIPHENYLETHYL)-AMINE

Hugh C. Vincent, Zion, and Frederick J. Kirchmeyer, Waukegan, Ill., assignors to Abbott Laboratories, North Chicago, Ill., a corporation of Illinois Application January 13, 1953, Serial No. 331,114

15 Claims. (Cl. 167—58)

This invention relates to new therapeutic compositions of penicillin and more particularly to preparations of N-methyl-(2-hydroxy-1,2-diphenylethyl)-amine penicillin salts and to the method of preparing said compositions.

Penicillin salts of N-methyl-(2-hydroxy-1,2-diphenylethyl)-amine penicillin are relatively insoluble in water and are useful in repository penicillin therapy when it is desired to have penicillin present in blood stream for a prolonged period. Parenteral preparations of N-methyl-(2-hydroxy-1,2-diphenylethyl)-amine penicillin have had only limited use, however, and this is at least in part due to the difficulty in preparing injectable compositions having a unit concentration sufficiently high to provide therapeutic penicillin blood levels or satisfactory prophylatic penicillin blood levels. A further limitation has been the necessity and difficulty of obtaining the N-methyl-(2-hydroxy-1,2-diphenylethyl)-amine penicillin salts in a sufficiently large crystal size to form a suitable aqueous suspension.

It is therefore an object of the present invention to provide an aqueous suspension of an N-methyl-(2-hydroxy-1,2-diphenylethyl)-amine penicillin salt which is sufficiently fluid for convenient administration.

It is also an object of the invention to provide an aqueous suspension of an N-methyl-(2-hydroxy-1,2-diphenylethyl)-amine penicillin salt having a high unit concentration suitable for convenient parenteral administration.

It is still another object of the invention to provide an aqueous suspension of an N-methyl-(2-hydroxy-1,2-diphenylethyl)-amine penicillin salt having a high unit concentration suitable for parenteral administration without increasing the viscosity thereof above that which is suitable for parenteral administration.

Other objects of the invention will be apparent from the detailed description and claims to follow.

Prior to the present invention it was impossible to prepare highly concentrated aqueous suspensions of an N-methyl-(2-hydroxy-1,2-diphenylethyl)-amine penicillin salt suitable for parenteral administration. Thus, when an aqueous suspension was prepared using the fine crystals of an N-methyl-(2-hydroxy-1,2-diphenylethyl)-amine penicillin salt obtained even when special precipitation and classifying procedures were employed, it was difficult to form a parenterally injectable suspension of an N-methyl-(2-hydroxy-1,2-diphenylethyl)-amine penicillin salt having a unit concentration of about 300,000 units per cc. in the usual penicillin aqueous vehicle. When attempts were made to prepare an aqueous suspension of the fine crystals an N-methyl-(2-hydroxy-1,2-diphenylethyl)-amine penicillin salt having a unit concentration of 600,000 units per cc. an extremely thick paste-like composition was obtained which was entirely unsuitable for parenteral administration even by means of a cartridge type syringe and which was incapable of being drawn into or ejected from the usual 20 gauge hypodermic needle.

It has now been discovered that a new and useful aqueous suspension of N-methyl-(2-hydroxy-1,2-diphenylethyl)-amine penicillin salts suitable for parenteral administration can be prepared by combining a water soluble penicillin salt with the N-methyl-(2-hydroxy-1,2-diphenylethyl)-amine penicillin salt. Thus, by combining as little as about 100,000 units per cc. of an alkali metal penicillin salt with a suspension of an N-methyl-(2-hydroxy-1,2-diphenylethyl)-amine penicillin salt normally having a thick paste-like consistency, it is possible to transform the thick suspension into a fluid-like low viscosity composition entirely suitable for administration by means of the usual 20 gauge hypodermic needle. It is also possible by incorporating water soluble penicillin salt with an N-methyl-(2-hydroxy-1,2-diphenylethyl)-amine penicillin salt composition having a damp powdery consistency to transform the composition into an aqueous suspension which is readily adaptable for parenteral administration by means of the usual hypodermic or cartridge type syringe having a standard 20 gauge hypodermic needle.

The fluidizing effect of the water soluble penicillin salts is particularly evident on aqueous suspensions of the penicillin salts of N-methyl-(2-hydroxy-1,2-diphenylethyl)-amine since these penicillin salts as prepared have an unusually large proportion of small micro crystals or micro crystalline particles having an average particle size substantially less than 5 microns. The specific surface of the N-methyl-(2-hydroxy-1,2-diphenylethyl)-amine penicillin G salt is approximately 44,000 sq. cm./gr. The fluidizing effect of the present invention is thus applicable to all aqueous suspensions of the N-methyl-(2-hydroxy-1,2-diphenylethyl)-amine penicillin salts normally having a viscosity and consistency unsuitable for parenteral administration.

More particularly, it has been discovered that a remarkably fluid aqueous suspension of the N-methyl-(2-hydroxy-1,2-diphenylethyl)-amine penicillin salts can be formed by incorporating between about 50,000 and 300,000 units per cc. of a water soluble penicillin salt, such as the alkali metal penicillin salts, sodium penicillin, potassium penicillin, and other water soluble salts, such as calcium penicillin, with a wide range of concentrations of the N-methyl-(2-hydroxy-1,2-diphenylethyl)-amine penicillin salts. The fluidizing effect of the water soluble penicillin salts is very evident with suspensions of N-methyl-(2-hydroxy-1,2-diphenylethyl)-amine penicillin salts having a unit concentration of 300,000 units per cc. but is even more pronounced and striking with a suspension of N-methyl-(2-hydroxy-1,2-diphenylethyl)-amine penicillin salts having a unit concentration of above 300,000 units per cc. and at about 600,000 units per cc. and higher unit concentrations. It should be evident, therefore, that the proportion of water soluble penicillin salt and the N-methyl-(2-hydroxy-1,2-diphenylethyl)-amine penicillin salt can be varied widely and still obtain the new and beneficial results of the present invention. It should also be understood that concentrations of water soluble penicillin salts above about 300,000 units per cc. can also be used for their fluidizing effect, particularly on high unit concentration suspensions.

While the N-methyl-(2-hydroxy-1,2-diphenylethyl)-amine penicillin salts can be held for a prolonged period suspended in an aqueous vehicle, the water soluble penicillin salts which exert the herein described fluidizing effect decompose within a relatively short time after being incorporated in an aqueous vehicle. It is therefore usually the preferred practice to thoroughly admix the dry N-methyl-(2-hydroxy-1,2-diphenylethyl)-amine penicillin salt and the water soluble penicillin salt along with the desired buffer, wetting agent, and preservative in a dry state and fill the above sterile dry mixture aseptically into vials or other suitable containers to which non-pyrogenic sterile water or saline solution is added immediately prior to administration to form the desired aqueous suspension. If desired the aqueous vehicle can be provided with the necessary buffer, wetting agent, and preservative. As the wetting agent, "Tween 80," a registered trade mark for a polyoxyethylene sorbitan monooleate has been found very effective, but other wetting agents may be effectively employed.

The following specific examples are for the purpose of illustrating the present invention and should not be construed to limit the invention to the precise materials employed or to the proportions used therein.

EXAMPLE I

A mixture of N - methyl - (2 - hydroxy - 1,2 - diphenylethyl) - amine penicillin G and potassium penicillin G suitable for parenteral administration upon mixing with an aqueous vehicle is prepared with the following materials:

| | |
|---|---|
| N - methyl - (2 - hydroxy - 1,2 - diphenylethyl) amine penicillin G (1060 u./mg.) | 5.66 |
| Potassium dibenzyl penicillin _____g__ | 1.33 |
| Aqueous vehicle _____cc__ | 5.5 |
| Vehicle to contain: | |
| Methyl p-hydroxybenzoate (preservative) ____ | 1.8 |
| Tween 80 (wetting agent) _____ | 1.67 |
| Sodium citrate (buffer) _____ | 6.9 |
| Water, q. s _____ | 1,000 |

The dry potassium penicillin G and the N-methyl-(2 - hydroxy - 1,2 - diphenylethyl) - amine penicillin G having an average particle size of less than about 1 micron are thoroughly mixed, sterilized, and filed aseptically into a suitable mixing vial. When it is desired to form the aqueous suspension thereof 5.5 cc. of the aqueous vehicle having the specified composition is introduced into the mixing vial and a uniform suspension containing approximately 600,000 units per cc. of N-methyl-(2 - hydroxy - 1,2 - diphenylethyl) - amine penicillin and 200,000 units per cc. of potassium penicillin is readily prepared by shaking the vial. The fluid preparation formed can be readily drawn into a syringe through a 20 gauge hypodermic needle and easily injected parenterally without plugging of the said hypodermic needle.

EXAMPLE II

An aqueous suspension of 600,000 units per cc. of the N - methyl - (2 - hydroxy - 1,2 - diphenylethyl) - amine penicillin G used in Example I was prepared using the aqueous vehicle disclosed in Example I. An extremely thick dry mixture was obtained which could not be ejected from the standard cartridge type syringe. It was necessary to destroy the cartridge syringe to remove the said penicillin suspension. When 200,000 units per cc. of potassium penicillin G was added to the above N-methyl-(2 - hydroxy - 1,2 - diphenylethyl) - amine penicillin preparation having a unit concentration of 600,000 units per cc. after placing on a watch glass, the N-methyl-(2 - hydroxy - 1,2 - diphenylethyl) - amine penicillin suspension immediately becomes flowable and the composition could be readily drawn into and ejected from the standard 20 gauge hypodermic needle.

Similar results were obtained when 200,000 units per cc. of sodium dibenzyl penicillin (amorphous) was added to the thick suspension of the N-methyl-(2-hydroxy-1,2-diphenylethyl)-amine penicillin G having the above concentration of 600,000 units per cc.

When 100,000 units per cc. of calcium dibenzyl penicillin is added to the N-methyl-(2-hydroxy-1,2-diphenylethyl)-amine penicillin G having a unit concentration of 600,000 units per cc., a similar fluidizing effect is observed although the effect is not so pronounced as with the alkali metal penicillin salt used in the same concentrations. It was thereafter determined that higher concentrations of calcium penicillin are required to obtain the equivalent degree of fluidizing of the N-methyl-(2-hydroxy-1,2-diphenylethyl)-amine penicillin salt.

EXAMPLE III

An aqueous suspension containing 375,000 units per cc. of N - methyl - (2 - hydroxy - 1,2 - diphenylethyl)-amine penicillin G salt having an average particle size of less than one micron was prepared by suspending 24.88 g. of the said penicillin salt having a potency of 1,060,000 units per g. in the aqueous vehicle containing varying amounts of potassium penicillin G having a potency of 1,505,000 units per g. with the total volume of the aqueous solution containing the potassium penicillin being adjusted in each instance to 50 ml. before forming the suspensions of the amine penicillin salt. The aqueous vehicle has the following composition:

| | |
|---|---|
| Citric acid (monohydrate) _____g./l__ | 2.735 |
| Trisodium citrate (anhydrous) _____g./l__ | 11.980 |
| Polyvinylpyrrolidone _____g./l__ | 10.4 |
| Tween 80 _____g./l__ | 1.038 |
| Water, q. s _____ | 1,000 |

The suspensions of the N-methyl-(2-hydroxy-1,2-diphenylethyl)-amine penicillin G salt containing the indicated amount of potassium penicillin G exhibits the viscosity reading, as measured by a Hoeppler falling ball viscometer, shown in Table I.

Table 1

| Units/cc. of Potassium Penicillin G | Grams of Potassium Penicillin G in 50 ml. aqueous solution | Viscosity in Centipoise (26° C.) |
|---|---|---|
| 0 | 0 | >161,000 (very thick).[1] |
| 50,000 | 2.22 | Paste (thick). |
| 100,000 | 4.44 | Paste (thin). |
| 150,000 | 6.66 | 65.1. |
| 200,000 | 8.88 | 70.7. |

[1] Calculated from data obtained with Hercules Hi-Shear viscometer employing Bob B'.

It is evident from the data in Table I that very large reductions in viscosity are effected when the potassium penicillin is added to the aqueous suspension of the N-methyl - (2 - hydroxy - 1,2 - diphenylethyl) - amine penicillin salt having a specific surface of 44,600 sq. centimeters per g. and a viscosity of greater than 161,000 centipoises before the addition of the potassium penicillin G.

EXAMPLE IV

A suspension of N-methyl-(2-hydroxy-1,2-diphenylethyl)-amine penicillin G having a concentration of 400,000 units per cc. is prepared with the N-methyl-(2-hydroxy-1,2-diphenylethyl)-amine penicillin salt and the aqueous vehicle used in Example III.

A Hercules Hi-Shear viscometer employing Bob B' is used to measure the viscosity of the above preparation at a temperature of 26° C. The rheograms of the said suspension before the addition of any potassium penicillin G is shown in Figure I at Graph No. 1, and the rheograms of the suspension after the addition of 200,000 units per cc. potassium penicillin G is shown in Graph No. 2 of Figure I.

From the rheograms in Figure I it can be calculated that the viscosity of the N-methyl-(2-hydroxy-1,2-diphenylethyl)-amine penicillin salt suspension without the added potassium penicillin G is substantially in excess of 161,000 centipoises at 26° C. After the addition of 200,000 units per cc. of potassium penicillin G the viscosity of the suspension is reduced to about 60 centipoises at 26° C. It is also evident from the rheograms of Figure I that the character of the suspension is very appreciably changed from a highly viscous very thixotropic suspension to a fluid-like suspension exhibiting only a slight degree of thixotropy.

The present invention is particularly useful in preparing suspensions of N-methyl-(2-hydroxy-1,2-diphenylethyl)-amine penicillin salts which are suitable for injection intramuscularly. The invention is also applicable to preparing injectable suspensions of N-methyl-(2-hydroxy-1,2-diphenylethyl)-amine in combination with other relatively insoluble penicillin salts or with the relatively more soluble penicillin salts, such as procaine penicillin. And, while the present invention has been illustrated by using penicillin G it should be understood that other penicillins can be employed with equal facility to produce the herein described penicillin preparation. Thus, the insoluble and soluble salt of penicillin O, penicillin F, penicillin X, penicillin A, and all other biosynthetic penicillins can be employed in the present invention.

The water soluble penicillin salts which can be used most effectively in the present invention are the nontoxic parenterally acceptable water soluble metal salts of penicillin, such as the alkali metal salts sodium and potassium penicillin, and the ammonium and calcium penicillin salts. Ordinarily, it is preferred to use an alkali metal salt and particularly, the potassium salts of penicillin G.

The water soluble salts of penicillin described herein and specifically applied to aqueous suspensions of the penicillin salts of N-methyl-(2-hydroxy-1,2-diphenylethyl)-amine are also effective in fluidizing or liquifying the other water insoluble penicillin salts, such as the penicillin salts of the N,N'-dibenzylethylenediamine, N,N'-didecenylethylenediamine, N,N'-diundecenylethylenediamine, N,N'-didodecenylethylenediamine, N,N'-ditetradecenylethylenediamine, N,N'-dihexadecenylethylenediamine and N,N'-dioctadecenylethylenediamine the saturated amine salts corresponding to the above unsaturated amine salts, and all other salts of penicillin which do not dissolve appreciably in the aqueous suspending vehicle therefore. In fluidizing the aqueous suspensions of the water insoluble penicillin salts, the penicillinate ions of the water soluble penicillin salts appear to exert a peptizing action upon colloidal particles of the insoluble penicillin salt which prevent the formation of a thick, non-fluid suspension or cause a thick, non-fluid suspension to become fluid. The peptizing or fluidizing action of the water soluble penicillin salts disclosed herein is most evident where the aqueous suspensions of the insoluble penicillin salts have a substantial proportion of the suspended particles of colloidal or near-colloidal sized particles, said particles having an average length of not substantially in excess of about 5 microns, and is substantially non-existent and insignificant where there is an absence of colloidal or near-colloidal sized particles of insoluble penicillin salt in the aqueous suspension.

This application is a continuation-in-part of applicants' co-pending application Serial No. 262,888, filed December 21, 1951; and which is a continuation-in-part of applicants' Serial No. 162,133, filed May 15, 1950, both of which are now abandoned.

Others may readily adapt the invention for use under various conditions of service, by employing one or more of the novel features disclosed or equivalents thereof. As at present advised with respect to the apparent scope of our invention, we desire to claim the following subject matter.

We claim:

1. A therapeutic composition comprising a mixture of a water soluble penicillin salt and a penicillin salt of N-methyl-(2-hydroxy-1,2-diphenylethyl)-amine having a substantial proportion thereof of a colloidal particle size having an average particle size of about 5 microns and being present in a concentration which normally does not form a fluid suspension when mixed with the volume of parenterally acceptable aqueous solvent required to provide the desired unit concentration, said mixture when incorporated in no more than the said volume of the parenterally acceptable aqueous solvent forming a fluid aqueous suspension of the N-methyl-(2-hydroxy-1,2-diphenylethyl)-amine penicillin suitable for parenteral administration by means of a hypodermic needle.

2. A therapeutic composition in a sterile dry dosage form comprising a dry mixture of a major proportion of a penicillin salt of N-methyl-(2-hydroxy-1,2-diphenylethyl)-amine having a substantial proportion thereof of a colloidal particle size having an average particle size of about 5 microns and being present in a concentration which normally does not form a fluid suspension when mixed with the volume of parenterally acceptable aqueous solvent required to provide the desired unit concentration and a minor proportion of a water soluble penicillin salt, said mixture when incorporated in no more than the said volume of the parenterally acceptable aqueous solvent forming a fluid aqueous suspension suitable for parenteral administration by means of a hypodermic needle.

3. A dry therapeutic composition comprising a dry mixture of an alkali metal penicillin salt and a penicillin salt of N-methyl-(2-hydroxy-1,2-diphenylethyl)-amine having a substantial proportion thereof of a colloidal particle size having an average particle size of about 5 microns and being present in a concentration which normally does not form a fluid suspension when mixed with the volume of parenterally acceptable aqueous solvent required to provide the desired unit concentration, said mixture when incorporated in no more than the said volume of the parenterally acceptable aqueous solvent for the said alkali metal salt forming a fluid aqueous suspension adaptable for parenteral administration by means of a hypodermic needle.

4. A therapeutic composition substantially as described in claim 3 wherein the alkali metal penicillin salt comprises potassium penicillin.

5. A therapeutic composition substantially as described in claim 3 wherein the alkali metal penicillin salt comprises sodium penicillin.

6. A therapeutic composition substantially as described in claim 3 wherein the alkali metal penicillin salt comprises lithium penicillin.

7. A therapeutic composition substantially as described in claim 2 wherein the water soluble penicillin salt is an ammonium penicillin salt.

8. A therapeutic composition substantially as described in claim 2 wherein the water soluble penicillin salt is a calcium penicillin salt.

9. A therapeutic composition comprising a fluid-like suspension readily injectable by means of a hypodermic needle of a N-methyl-(2-hydroxy-1,2-diphenylethyl)-amine penicillin salt having a substantial proportion thereof of a colloidal particle size having an average particle size of about 5 microns and being present in a concentration which normally does not form a fluid suspension when mixed with a volume of parenterally acceptable aqueous solvent required to provide the desired unit concentration dispersed in a parenterally acceptable aqueous vehicle containing a water soluble penicillin salt, said suspension having a viscosity substantially less than the viscosity of a suspension of the said amine penicillin salt containing the same quantity of the said aqueous vehicle from which the said water soluble penicillin salt is excluded.

10. A therapeutic composition comprising a fluid-like suspension readily injectable by means of a hypodermic needle of a N-methyl-(2-hydroxy-1,2-diphenylethyl)-amine penicillin salt having a substantial proportion thereof of a colloidal particle size having an average particle size of about 5 microns and being present in a concentration which normally does not form a fluid suspension when mixed with a volume of parenterally acceptable aqueous solvent required to provide the desired unit concentration dispersed in an aqueous vehicle containing an alkali metal penicillin salt, said suspension having a viscosity substantially less than the viscosity of a suspension of the said amine penicillin salt containing the same quantity of the said aqueous vehicle from which the said water soluble penicillin salt is excluded.

11. A therapeutic composition comprising a fluid-like readily injectable suspension of N-methyl-(2-hydroxy-1,2-diphenylethyl)-amine penicillin having a substantial proportion thereof of a colloidal particle size having an average particle size of about 5 microns and being present in a concentration which normally does not form a fluid suspension when admixed with the volume of parenterally acceptable aqueous solvent required to provide a desired unit concentration and having a penicillin concentration of at least about 300,000 units per cc. of the said amine penicillin dispersed in an aqueous vehicle containing in excess of about 50,000 units of an alkali metal penicillin salt dissolving therein, said suspension being readily injectable through a standard 20 gauge hypodermic needle.

12. A therapeutic composition comprising a fluid-like readily injectable suspension of N-methyl-(2-hydroxy-1,2-diphenylethyl)-amine penicillin having a substantial proportion thereof of a colloidal particle size having an average particle size of about 5 microns and being present in a concentration which normally does not form a fluid suspension when admixed with the volume of parenterally acceptable aqueous solvent required to provide a desired unit concentration and having a penicillin concentration of about 600,000 units per cc. of the said amine penicillin an aqueous vehicle containing about 80,000 units per cc. of an alkali metal penicillin salt, said suspension being readily injectable through a standard 20 gauge hypodermic needle.

13. A therapeutic composition as described in claim 1 wherein the alkali metal salt is potassium penicillin.

14. A therapeutic composition as described in claim 1 wherein the alkali metal salt is sodium penicillin.

15. A therapeutic composition as described in claim 1 wherein the alkali metal salt is lithium penicillin.

References Cited in the file of this patent

UNITED STATES PATENTS

| | | |
|---|---|---|
| 2,619,447 | Malcolm | Nov. 25, 1952 |
| 2,627,491 | Szabo | Feb. 3, 1953 |
| 2,650,217 | Macek | Aug. 25, 1953 |

OTHER REFERENCES

J. A. Ph. A., Pract. Pharm. Ed., June 1949, p. 330, "Pen-Aqua."

Bachman et al.: Fed. Procs., March 1951, vol. 10, No. 1, Part 1, p. 277, "Duration of Therapeutic Plasma Penicillin Levels With the Penicillin Salt of 1,2-diphenyl-2-methylaminoethanol."

Longacre: "Compenamine," Antibiotics and Chemotherapy, July 1951, pages 223–230.